United States Patent [19]

Evans et al.

[11] Patent Number: 5,554,218

[45] Date of Patent: Sep. 10, 1996

[54] CEMENT COMPOSITIONS AND METHODS OF UNDERWATER APPLICATION

[76] Inventors: Shawn Evans, 1610 Monmouth Dr., San Diego, Calif. 92109; Kevin Wallace, 394 Laveta Ave., Encinitas, Calif. 92024

[21] Appl. No.: 415,489

[22] Filed: Apr. 3, 1995

[51] Int. Cl.$^6$ .......................... C04B 22/12; C04B 111/74
[52] U.S. Cl. ........................ 106/639; 106/734; 106/816; 106/819; 427/397.7
[58] Field of Search .................... 106/639, 734, 106/816, 819; 427/397.7

[56] References Cited

U.S. PATENT DOCUMENTS

| | | | |
|---|---|---|---|
| 1,773,001 | 8/1930 | Huber | 106/734 |
| 1,782,471 | 11/1930 | Kirchner | 106/734 |
| 1,968,152 | 7/1934 | Kirshner et al. | 106/733 |
| 2,240,744 | 5/1941 | Arpin | 106/639 |
| 2,434,695 | 1/1945 | Helms | 106/734 |
| 2,918,385 | 12/1959 | Arpin et al. | 106/639 |
| 4,502,887 | 3/1985 | Tsuda | 106/639 |
| 4,508,572 | 4/1985 | Sakuta et al. | 106/639 |
| 4,707,188 | 11/1987 | Tsuda et al. | 106/639 |
| 4,743,301 | 5/1988 | Ito et al. | 106/639 |
| 5,076,850 | 12/1991 | Eschborn, II et al. | 106/734 |

FOREIGN PATENT DOCUMENTS

| | | | |
|---|---|---|---|
| 2326647 | 12/1974 | Germany | 106/639 |
| 58-069760 | 4/1983 | Japan | 106/639 |
| 58-115051 | 7/1983 | Japan | 106/639 |
| 60-122761 | 7/1985 | Japan | 106/639 |
| 590285 | 1/1978 | U.S.S.R. | 106/734 |

*Primary Examiner*—Anthony Green
*Attorney, Agent, or Firm*—Campbell & Flores LLP

[57] ABSTRACT

This invention relates generally to the field of cement, especially cement for underwater application. The invention provides a composition for preparing cement that solidifies underwater comprising exothermic micro particles and base cement. Exothermic micro particles are less than about two thousand two hundred and fifty micrometers in diameter and can be, for example, calcium chloride. The invention further provides a kit for preparing cement that solidifies underwater comprising exothermic micro particles in a container and base cement. The invention provides a method of underwater construction or repair comprising mixing a composition comprising exothermic micro particles and base cement with water and applying the composition to an underwater structure where the composition solidifies. The composition, kit and method are particularly well suited for swimming pool repair.

23 Claims, No Drawings

CEMENT COMPOSITIONS AND METHODS OF UNDERWATER APPLICATION

BACKGROUND OF THE INVENTION

This invention relates generally to the field of cement, especially cement for underwater application.

Cement is used underwater for many purposes including, for example, in pools, dams, piers, retaining walls and tunnels. Cement can be cast and repaired out-of-water and subsequently submerged, but this method is often undesirable or impossible. For example, draining water out of a filled swimming pool to repair it is undesirable as this can damage the pool and waste large amounts of valuable water. The damage occurs when the equilibrium between the water weight pushing downward and the ground and pool pushing upward is unbalanced, causing the walls and bottom to crack and separate. Similarly, removing water from a dam to repair it is undesirable because of the resulting structural compromises and water waste. It is often impracticable to remove the water surrounding submerged pylons of piers to repair them. When the cement structure must be attached to an existing underwater structure, underwater casting and solidification can be the only effective method of construction.

There are many factors that must be controlled for successful application of cement underwater. Of these, the hardening time, that between mixing and solidification, is particularly important because, if it is too long, the cement does not solidify at all but simply dissolves in the surrounding water, herein the environmental water. The major problem with current cement compositions is the failure to solidify underwater before dissolving.

The temperature at which the hardening reaction occurs is inversely proportional to the hardening time. To raise the reaction temperature and shorten the hardening time, an exothermic substance, such as calcium chloride ($CaCl_2$), is often combined with base cement and water. The chemical reactions between base cement, water and calcium chloride are as follows:

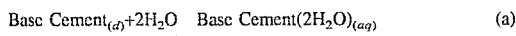

(a)

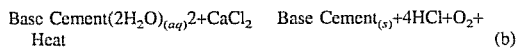

(b)

where Base Cement$_{(d)}$, Base Cement$(2H_2O)_{(aq)}$ and Base Cement$_{(s)}$ are the base cement in dry, liquid and solid states, respectively. Heat is the exothermic heat liberated by calcium chloride due to reaction with water.

In underwater applications, the exothermic heat released by calcium chloride must raise the reaction temperature of the liquid cement despite the cooling by the environmental water. Environmental water has significantly higher thermal capacity and conductivity than air and more heat is needed to raise the reaction temperature underwater than in air. A problem with current cement compositions is that exothermic substances do not provide enough heat to overcome the cooling by environmental water, especially cold environmental water.

Current cement compositions fail to provide sufficient heat, in part, because the calcium chloride is in clumps having a small surface-to-volume ratio, a low dissolution rate and a low heating rate. Calcium chloride used in cement compositions is not refined and current processing and packaging procedures do not control water absorption. Calcium chloride is extremely hydrophilic and readily absorbs water from any source including the atmosphere. Water absorption causes the exothermic substance to cake to large clumps. As a result, the calcium chloride is in large clumps several centimeters in diameter. Solid material in liquid dissolves in inverse proportion to the surface-to-volume ratio of the solid. The large calcium chloride clumps have low dissolution rates because of the small surface-to-volume ration. The dissolution rate determines the heating rate of a calcium chloride because calcium chloride only produces heat when it reacts with water. A reduced heating rate results in lower reaction temperatures because the environmental water cools the liquid cement faster than it is heated. Thus, the small surface-to-volume ratio of calcium chloride limits the rate of heat produced.

Another reason current cement compositions do not produce enough heat for underwater applications is that the calcium chloride has reacted with water before mixing with cement. Exothermic heat liberated before mixing depletes the amount of heat produced upon mixing with cement. In some preparations, calcium chloride is dissolved in water before mixing which causes large amounts of heat to be loss before mixing with cement.

Underwater cement applications require that one precisely control the hardening time of the cement. One cannot use cement if the cement solidifies before it can be applied. Moreover, different hardening times are required for different underwater applications. For example, a short hardening time may be required to repair a leak so that the cement solidifies before being carried away in the flowing stream of water. A long hardening time may be needed to plaster a large surface because more time is needed to apply the cement. A shorter hardening time may be needed to repair a vertical surface than on a horizontal surface because of downward gravity flow of the cement on a vertical surface. In addition, the hardening time must allow for transportation time to the underwater site. Further, precise control of the reaction temperature also is needed because the reaction temperature determines the structural properties of the solidified cement such as hardness.

Current cement compositions do not allow one to precisely the hardening time because the heat released from the exothermic substance cannot be precisely controlled. This is because the exothermic agent produces variable amounts of heat. As described above, the surface-to-volume ratio effects the heating rate and the reaction temperature. Current exothermic substances have wide variation in the surface-to-volume ratio and therefore variable amounts of heat are produced. Moreover, current calcium chloride varies on a weight basis because of variable amounts of water content.

Clearly, there is a need for a cement composition that solidifies underwater with a precise hardening time. There is also a need for a cement that the allows for the adjustment of the hardening time to suit the underwater application. To achieve these goals, an exothermic substance is needed that produces sufficient heat to raise the reaction temperature to a point where the cement composition solidifies before dissolving, even in cold environmental water. Further, the exothermic substance must allow one to precisely control the amount of heat produced. The present invention satisfies these needs and provides related advantages as well.

SUMMARY OF THE INVENTION

The present invention provides a composition for underwater construction and repair comprising base cement and exothermic micro particles that solidify underwater. The exothermic micro particles are particles less than approximately two thousand two hundred and fifty (2,250)

micrometers in diameter composed of any exothermic material capable of producing sufficient heat to solidify cement underwater, examples of which are, calcium chloride, calcium nitrate, aluminum chloride, or mixtures thereof.

The present invention also provides a kit for preparing cement under water and methods for constructing and repairing cement underwater.

DETAILED DESCRIPTION OF THE INVENTION

Compositions containing exothermic micro particles have been found very advantageous for underwater cement applications. The exothermic micro particles produce very high rates of exothermic heating when combined with base cement and water. The exothermic heat produced is sufficient to raise the reaction temperature to a point where the cement composition solidifies underwater, even in cold environmental water. A primary reason for the advantages of the present invention is that the exothermic micro particles have a very high surface-to-volume ratio that releases heat at a very high rate when added to water. One can adjust the reaction temperature by varying the amount exothermic micro particles in the composition and the size of the exothermic micro particles. Moreover, since the exothermic micro particles have uniformly large surface-to-volume ratios, one can precisely control the rate of heating and the hardening time.

As used herein, the term "exothermic micro particles" includes any substance that can be made into a population of fragments having diameters less than approximately 2,250 micrometers that produces sufficient heat to solidify cement underwater. Exothermic micro particles that produce cement temperatures of about 70° F. or greater underwater are useful. Exothermic micro particles include a broad range of materials, the micro particulate form being the critical element of the present invention. Exothermic micro particles can be, for example, calcium chloride, calcium nitrate, aluminum chloride or mixtures thereof. Exothermic micro particles that are useful, but are not specified, can be selected from those compounds that produce heat when added to water based on standard heat of dissolution measurements such as the change in the enthalpy. Standard references provide the change enthalpy values for compounds and can be used to screen potential candidates. See, for example, *The Merck Index*, 11th Edition, S. Budavari, Ed., published by Merck & Co., Rahway, N.J. (1989), herein expressly incorporated by reference. From the screened group of exothermic substances, candidates can be assayed to find out if the micro particulate form solidifies cement underwater.

Smaller size populations of exothermic micro particles can be selected from the continuum of particle sizes below approximately 2,250 micrometer diameters. Exothermic micro particles less than approximately one thousand eight hundred and seventy five (1,875), one thousand five hundred (1,500), and one thousand two hundred and fifty (1,250) micrometer diameters are useful for underwater applications. Exothermic micro particles can have a minimum lower size limit as well as a maximum upper size limit. For example, exothermic micro particles can be from approximately 1,875 to 2,250, 1,500 to 1,900, 1,250 to 1,500 micrometers in diameter. Selection of a specific size range provides one with control of heating, reaction temperature and hardening time of the cement. Generally, exothermic micro particles containing smaller size particles provide more heat than larger sizes for a given weight. One can use smaller exothermic micro particles to obtain higher reaction temperatures or shorter hardening times than larger exothermic micro particles. The term diameter as used herein means a cord extending through the center of the particle. Exothermic micro particles can have any shape. The size of the exothermic particles can be found by any method used to size micro particles including, for example, micro examination and counting and the separation methods described below.

Any separation method that isolates micro particles according to size can be used to obtain exothermic micro particles of the present invention. Particle separation methods suitable for the present invention are well known to those skilled in the art. For example, dry sieving can be used. In this technique, the exothermic substance is placed on a screen made up of uniform apertures. By application of some type of motion to the screen, the exothermic micro particles smaller than the apertures are made to pass through. The sieve motion generally is either (1) horizontal, which tends to loosen the packing of exothermic particles in contact with the screen surface, permitting the entrapped subsieve exothermic particles to pass through or (2) vertical, which serves to agitate and mix the exothermic particles as well as bring more of the subsieve exothermic micro particles to the screen surface.

The screen can be any type used sieving separation methods. Examples of suitable screens include woven wire screens, bolting cloth, closely spaced bars and punched plates. Most screening is accomplished with woven wire screens in which aperture size ranges from approximately seventy micrometers to ten millimeters in diameter. Precision electroformed mesh having aperture sizes of five to two hundred micrometers diameter can be used. Selection of particular aperture size screen is decided by the size of exothermic micro particles needed. Generally, smaller apertures result in micro particles having a higher surface-to-volume ratio but at a reduced rate of production compared with larger apertures.

For continuous operation, the screen(s) is attached to mechanical or electromagnetic devices to supply the energy required to shake the exothermic particles through the openings in the screen and prevent accumulation of fines within the openings as this tends to clog them and slow down operation. Sieves may be used either in a sequence of sizes through which the exothermic micro particles must pass or singly in the required size. A nest of standard sieves arranged in descending order can be used to collect exothermic micro particles of different sizes. Sifters include but are not limited to oscillation, gyrator, circular rotatory, vibrating, shaking and revolving sifters.

Exothermic articles having a specified size range can be obtained with various shifter configurations. In one example, the Gyro-Whip, the exothermic substance enters the top and spreads over the first sieve. Some finer exothermic micro particles drop through and are discharged into trough channels and the remaining particles move to the next sieve in order. The process is repeated until complete separation is achieved. Another is centrifical screening as used in the Symons Vscreen where the exothermic substance is pushed through a spinning vertical wire cloth cylinder. Downward airflow instead of shaking and tapping is used to move particles through the screen openings.

Elutriation is another separation method in which the exothermic micro particles are suspended in moving gas. In vertical elutriation, at any particular velocity of gas, exothermic micro particles of a given size move upwards in the air while larger exothermic micro particles settle out under gravity. In horizontal elutriation, a stream of suspended exothermic micro particles is passed over a settling chamber and exothermic micro particles that leave the stream are collected in the bottom of the chamber. Centrifugal elutriation is the same process, except the gas is caused to spin to impart a high centrifugal force to the suspended exothermic micro particles. Those exothermic particles that are too large to follow the direction of flow separate out on the walls or bottom of the elutriator. Examples of centrifugal elutriators include, for example, DorrClone and Super Classifier.

It is advantageous that the contact between exothermic particles and water be minimized during the separation process. Conventional dehydrating means can be used to reduce water contact during the separation methods. These means include, for example, dehydrating the separating devices with anhydrous alcohol or heating before use. Separation can be conducted in a dry inert gas or desiccated air environment.

The exothermic micro particles themselves can be desiccated by any method that will remove water without adversely effecting exothermic heating properties. Desiccation methods include, for example, heat, vacuum, chemical and dry gas desiccation. Heat desiccation can be by any means of heating including convection, conduction and radiant heating. Examples of heating methods include oven baking or microwave heating. An example of heat desiccation method is heating the exothermic micro particles in an oven temperature between 212° and 500° F. for twenty to forty minutes. Examples of vacuum drying include placing the exothermic particles in a vacuum chamber and evacuating the chamber using any vacuum generating means including, for example, a roughing pump, aspirator and diffusion pump. Further, the particles can be freeze-dried in a vacuum chamber using well known freeze-drying methods. Chemical desiccation includes placing the exothermic particles in an air tight chamber with a sufficient amount of a water absorbing material, such as silica gel, to absorb the water out of the exothermic substance. Dry gas desiccation includes placing the exothermic particles in a container and purging the container with dry air or dry gas such as dry inert gas. A combination of desiccating methods can be used. Absorbed water content can be monitored by any method for this purpose including, for example, wet-dry weight, spectrophotometric and chromographic methods.

A container is any structure that can hold exothermic micro particles. Preferred containers are those that are impermeable to water. For example, a container can be structure that holds the exothermic micro particles in a vacuum environment such as a vacuum shrink wrap package. Standard materials and methods well known in the art can be used to make vacuum shrink wrap packages. Another example is a structure that holds the exothermic micro particles are in a dry inert gas environment. Yet another example is a structure that holds the exothermic micro particles with chemical desiccant, such as silica gel. A water impermeable container represents a significant advance in kits containing exothermic micro particles. The exothermic micro particles stored in a water impermeable container insures that the exothermic micro particles have a low water content and a high surface-to-volume ratio at the time of use.

Base cement is any cement that can solidify underwater. A broad range of base cement can be used because the heat provided in the present invention will solidify any type of base cement. Examples of base cement include cement used for pool repair, particularly "riverside white" and "high early." Riverside white has the following approximate composition: 10% aluminum, 30% calcium, 10% magnesium, 30% silicon, 8% phosphate, 5% iron, 1% sodium, 1% titanium and 5% inert residuals.

Because the claimed invention produces a high rate of exothermic heating, environmental water can be at any temperature so long as it is liquid. In many situations, such as winter work, cold water is the only water available. The claimed invention is particularly useful in environmental water temperatures above 30° F. The claimed invention offers the significant advantage that the composition will solidify even in cold water.

The composition may include a coloring agent. Examples of coloring agents include, for example, cobalt blue. The amount of coloring agent added depends on the color needed.

An underwater structure is any surface that can be repaired with cement or any form used in cement construction that is at least partly emersed in or covered by environmental water. The underwater structure can be made of any material including, for example, cement, wood or earth. An example of an underwater structure is a pool that includes, for example, a swimming pool, spa, fish pond, decorative pond or fountain. Other examples of underwater structures include for example sidewalks, dams, piers, retaining walls, bridges and tunnels. An example of a form is a structure that contains liquid cement during solidification.

The proportions of exothermic micro particles and base cement are within the skill of the routineer to determine. Test batches of cement can be made to empirically determine the optimum proportions. Generally, about one tenth (0.1) to fifty (50) per cent by weight exothermic micro particles to base cement can be used. The proportion of exothermic micro particles and base cement required depends upon several factors including the environmental water temperature, with a higher proportion of exothermic micro particles used when higher cement temperatures are required such as in cold environmental water.

The consistency of the cement composition after mixing but before solidifying can be adjusted by the proportion of base cement to water. Generally, more water is used for thinner consistency and less for thicker consistency liquid cement. For example, liquid cement can be putty, paste or liquid. A creamy consistency is useful for swimming pool repair. The consistency can be adjusted so as to allow the liquid cement to be poured, pumped or plastered.

To repair or construct an underwater structure, the claimed cement composition is mixed and applied to an underwater structure where it solidifies. Mixing can occur in or out of the environmental water by any means known to mix cement including, for example, stirring or tumbling means powered by hand or motor. The liquid cement can be transported by any means that gets the cement to the underwater site in a physical state suitable for the job. Transporting, as used herein, means moving the liquid cement both out of and in the environmental water. Means for transporting the cement out of the environmental water include, for example, a shovel, wheel barrel, cement truck, pipeline or pump. Means for transporting the cement in the environmental water include, for example, hand carrying, mechanically lowering or carrying in a submersible. The liquid cement can be applied underwater using any means capable of doing so including, for example, a diver manually applying the cement by plastering, filling, or injecting the liquid cement. A diver as used herein can include any person or robot equipped for the environmental water. A diver can include, for example, a skin diver, a scuba diver, a hard-hat diver, a person in a submarine or submersible vehicle or remote controlled robotic apparatus. Before applying the cement, the underwater structure is suitably prepared to achieve the required adhesion, strength and appearance. Suitable preparations include, for example, shaping and cleaning the surface or installing steel reinforcement rods.

The following examples are meant to illustrate and not limit the claimed invention.

EXAMPLE 1

Table 1 shows the exothermic micro particle size, maximum temperature and viability. The maximum temperature is the highest temperature of the cement underwater. Viable is defined as greater than about 50 percent solidification of the cement underwater. The reaction mixture is 10 grams of calcium chloride exothermic micro particles, 100 grams of riverside white base cement, and 75 cubic centimeters of water at an initial temperature of 60° F.

TABLE 1

| EXOTHERMIC MICRO PARTICLE SIZE RANGE (MICROMETERS) | MAX. TEMPERATURE (°F.) | VIABLE |
|---|---|---|
| <250–1,250 | 120 | Yes |
| 1,250–1,500 | 104 | Yes |
| 1,500–1,875 | 100 | Yes |
| 1,875–2,250 | 74 | Yes |
| 2,250–2,500 | 64 | No |
| >2,500 | 62 | No |

EXAMPLE 2

Table 2 shows the per cent calcium chloride exothermic micro particles, maximum temperature and time. The percent exothermic micro particles is on a weight per cent relative to the base cement weight. The maximum temperature is the highest temperature of the cement underwater. Only compositions that are viable are shown. The time is the length of time to reach maximum temperature. The reaction mixture is calcium chloride exothermic micro particles less than about 2,250 micrometers diameter, 100 grams of riverside white base cement and 75 cubic centimeters of water at an initial temperature of 60° F.

TABLE 2

| EXOTHERMIC MICRO PARTICLE PERCENT | MAX. TEMPERATURE (°F.) | TIME (MIN) |
|---|---|---|
| 0.5 | 78 | 15 |
| 1.0 | 78 | 15 |
| 2.5 | 80 | 12 |
| 5.0 | 90 | 10 |
| 7.5 | 98 | 10 |
| 10.0 | 102 | 4 |
| 12.5–50.0 | 120 | 2 |

EXAMPLE 3

Table 3 shows the hardening time and environmental water temperature. The two hardening times for each temperature are the time hardening begins and the time complete solidification occurs. Only compositions that are viable are shown. The reaction mixture is 10 grams calcium chloride exothermic micro particles less than 2,250 micrometers diameter, 100 grams riverside white base cement and 75 cubic centimeters of water.

TABLE 3

| HARDENING TIME (MIN) | ENVIRONMENTAL WATER TEMPERATURE (°F.) |
|---|---|
| 0–10 | 80 |
| 0–10 | 75 |
| 2–16 | 70 |
| 4–16 | 65 |
| 4–20 | 60 |
| 5–70 | 55 |
| 10–38 | 50 |
| 15–44 | 45 |
| 20–45 | 40 |
| 20–60 | 35 |
| 20–60 | 30 |

EXAMPLE 4

For repairing a cavity in a swimming pool, rusted plaster, rotted gunite and infected/rusted rebar is removed underwater using standard methods, such as, for example, hand chiseling, hand hammering or pneumatic drilling. Out-of-water, riverside white is mixed with water until a creamy texture is achieved to which calcium chloride exothermic micro particles less than about 2,250 micrometer diameter are added. For a cavity about 5 by 9 by 3 inches deep, 1.5 quarts of riverside white and 1 pint of calcium chloride exothermic micro particles are used. The mixture is allowed to begin hardening and then taken by hand underwater and plastered in the cavity. A sufficient amount of cement is added such that the added cement is flush with the surrounding cement.

For repairing cracks in a swimming pool, a crotch line is cut underwater along the crack down to the gunite using standard methods such as, for example, pneumatic grinding. Out-of-water, riverside white and water are mixed until a creamy consistency is achieved. Two parts riverside white and one part calcium chloride exothermic micro particles are used. More calcium chloride exothermic micro particles are used for repairing cracks than cavities because hotter cement temperatures are desirable when repairing cracks. The cement is allowed to begin to harden and taken underwater by hand and plastered in the crotch line. A sufficient amount of cement is added such that the added cement is flush with the surrounding cement Although the invention has been described with reference to the presently-preferred embodiments, it should be understood that various modifications can be made without departing from the spirit of the invention. Accordingly, the invention is limited only by the following claims.

We claim:

1. A composition for preparing cement that solidifies underwater comprising exothermic micro particles and base cement, wherein the exothermic micro particles are less than about 2,250 micrometers in diameter and are present in an amount sufficient to solidify the cement underwater.

2. The composition of claim 1 wherein the exothermic micro particles are selected from the group consisting of calcium chloride, calcium nitrate, aluminum chloride and mixtures thereof.

3. The composition of claim, 2 wherein the exothermic micro particles are calcium chloride.

4. The composition of claim 1 wherein the exothermic micro particles are desiccated.

5. The composition of claim 1 wherein the exothermic micro particles are calcium chloride and the base cement is riverside white.

6. The composition of claim 1 further comprising a coloring agent.

7. The composition of claim 1, wherein the exothermic micro particles are less than about 1,875 micrometers in diameter.

8. The composition of claim 1, wherein the exothermic micro particles are less than about 1,500 micrometers in diameter.

9. The composition of claim 1, wherein the exothermic micro particles are less than about 1,250 micrometers in diameter.

10. A kit for preparing cement that solidifies underwater comprising exothermic micro particles in a water impermeable container and base cement, wherein the exothermic micro particles are less than about 2,250 micrometers in diameter and are present in an amount sufficient to solidify the cement underwater.

11. The kit of claim 10 wherein the exothermic micro particles are selected from the group consisting of calcium chloride, calcium nitrate, aluminum chloride and mixtures thereof.

12. The kit of claim 10 wherein the water impermeable container is a vacuum sealed package.

13. The kit of claim 12 wherein the exothermic micro particles are desiccated.

14. The kit of claim 10, wherein the exothermic micro particles are less than about 1,875 micrometers in diameter.

15. The kit of claim 10, wherein the exothermic micro particles are less than about 1,500 micrometers diameter.

16. The kit of claim 10, wherein the exothermic micro particles are less than about 1,250 micrometers diameter.

17. A method of underwater construction and repair, comprising the steps of:

mixing a composition comprising exothermic micro particles, base cement and water, wherein the exothermic micro particles are less than about 2,250 micrometers in diameter and are present in an amount sufficient to solidify the cement underwater; and applying the composition to an underwater structure, wherein the composition solidifies in contact with environmental water.

18. The method of claim 17 wherein the exothermic micro particles are selected from the group consisting of calcium chloride, calcium nitrate, aluminum chloride, and mixtures thereof.

19. The method of claim 17, wherein the exothermic micro particles are desiccated.

20. The method of claim 17, wherein the exothermic micro particles are calcium chloride, the base cement is riverside white and the underwater structure is a swimming pool.

21. The method of claim 17, wherein the exothermic micro particles are less than about 1,875 micrometers in diameter.

22. The method of claim 17, wherein the exothermic micro particles are less than about 1,500 micrometers in diameter.

23. The method of claim 17, wherein the exothermic micro particles are less than about 1,250 micrometers in diameter.

* * * * *